(12) United States Patent
Yonezawa et al.

(10) Patent No.: US 8,302,947 B2
(45) Date of Patent: Nov. 6, 2012

(54) CLAMPING APPARATUS

(75) Inventors: Keitaro Yonezawa, Kobe (JP); Toshinao Nishimoto, Kobe (JP); Hironori Yamada, Kobe (JP)

(73) Assignee: Kosmek Ltd., Hyogo (JP)

(*) Notice: Subject to any disclaimer, the term of this patent is extended or adjusted under 35 U.S.C. 154(b) by 380 days.

(21) Appl. No.: 12/745,573

(22) PCT Filed: Nov. 28, 2008

(86) PCT No.: PCT/JP2008/071635
§ 371 (c)(1),
(2), (4) Date: Jun. 1, 2010

(87) PCT Pub. No.: WO2009/072440
PCT Pub. Date: Jun. 11, 2009

(65) Prior Publication Data
US 2010/0308521 A1    Dec. 9, 2010

(30) Foreign Application Priority Data

Dec. 4, 2007   (JP) .................................. 2007-341659

(51) Int. Cl.
*B23Q 3/06* (2006.01)
(52) U.S. Cl. ............. 269/32; 269/24; 269/137; 269/138
(58) Field of Classification Search .................... 269/32, 269/24, 27, 137–138, 20, 55, 95
See application file for complete search history.

(56) References Cited

U.S. PATENT DOCUMENTS

| 3,512,794 | A | * | 5/1970 | Lohman | 279/123 |
| 3,578,306 | A | * | 5/1971 | Smith | 269/24 |
| 4,410,169 | A | * | 10/1983 | Swenson | 269/32 |
| 4,451,026 | A | * | 5/1984 | Coope | 269/24 |
| 4,830,349 | A | * | 5/1989 | Miyata | 269/32 |
| 4,932,640 | A | * | 6/1990 | Shirakawa | 269/32 |

(Continued)

FOREIGN PATENT DOCUMENTS

| EP | 0508881 A2 | 10/1992 |
| JP | 60056838 A | 4/1985 |
| JP | 4269141 A | 9/1992 |

(Continued)

OTHER PUBLICATIONS

International Search Reort in PCT/JP2008/071635, Jan. 20, 2009.

(Continued)

*Primary Examiner* — Lee D Wilson
(74) *Attorney, Agent, or Firm* — Bacon & Thomas PLLC

(57) ABSTRACT

A clamp rod (6) inserted into a guide hole (5) of a housing (4) has: a clamping member (10); an inner piston (12); and a tapered pressure receiving surface (13), which are provided in this order in an axial direction from a left end to a right end. An output portion (26) for locking and releasing is provided on an inner periphery of a right end portion of one outer piston (23) inserted between the inner piston (12) and the guide hole (5). A collet (33) inserted between the pressure receiving surface (13) and the guide hole (5) is formed of four divided members (34) arranged circumferentially at substantially regular intervals. An input portion (36) driven by the output portion (26) and a pressing surface (40) which makes a wedge-engagement with the pressure receiving surface (13) from a right side are respectively provided in an outer periphery portion and on an inner periphery portion of each divided member (34). A lock chamber (42) and a release chamber (47), where pressurized fluid is supplied and discharged, are provided on respective outer sides of both ends of the outer piston (23).

9 Claims, 1 Drawing Sheet

U.S. PATENT DOCUMENTS

| | | | | | |
|---|---|---|---|---|---|
| 5,071,109 | A | * | 12/1991 | Yonezawa | 269/137 |
| 5,174,554 | A | * | 12/1992 | Yonezawa | 269/24 |
| 5,181,700 | A | * | 1/1993 | Yonezawa | 269/24 |
| 5,181,701 | A | * | 1/1993 | Yonezawa | 269/32 |
| 5,690,546 | A | * | 11/1997 | Mascola | 451/365 |
| 5,752,693 | A | * | 5/1998 | Brisco | 269/24 |
| 5,979,886 | A | * | 11/1999 | Craft et al. | 269/24 |
| 6,422,550 | B1 | * | 7/2002 | Stiefel et al. | 269/32 |
| 2010/0308521 | A1 | * | 12/2010 | Yonezawa et al. | 269/32 |

FOREIGN PATENT DOCUMENTS

| | | |
|---|---|---|
| JP | 4322829 A | 11/1992 |
| JP | 5185341 A | 7/1993 |
| JP | 7299685 A | 11/1995 |

OTHER PUBLICATIONS

Supplemental Search Report of EPO regarding European Patent Application No. 08856261.6, Apr. 4, 2011.

* cited by examiner

US 8,302,947 B2

CLAMPING APPARATUS

TECHNICAL FIELD

The present invention relates to an apparatus which clamps an object to be fixed, such as a mold, on a stationary table.

BACKGROUND OF THE INVENTION

As such a clamping apparatus, conventionally, there is an apparatus described in the following Patent Document 1 (Japanese Unexamined Patent Publication No. 07-299685). This conventional art is constructed as follows.

A guide hole is opened in a leading end surface of a housing to be attached to a support surface of a stationary table. A clamp rod inserted into the guide hole includes, in the following order in an axial direction: a clamping member provided at a leading end side; a first outer peripheral surface which supports a piston for releasing; a tapered surface with which a pressing surface of an annular collet makes a wedge-engagement from a base end side; and a second outer peripheral surface which supports a piston for locking.

Patent Document 1: JP07-299685

SUMMARY OF THE INVENTION

Problems to be Solved by the Invention

There are following problems in the above-described conventional art. Since it is necessary to arrange two pistons on respective outer sides of the collet in directions toward both ends thereof, the length of the clamp rod is long, which increases the total length of the clamping apparatus.

In addition, the tapered surface for wedge-engagement is arranged on a midway portion of the clamp rod in its axial direction. Because of this, when an action portion at a leading end of the clamp rod clamps an object to be fixed such as a mold, a distance between a fulcrum portion and a power portion (a portion where force is applied) on an outer periphery of the collet, which portions receive a clamping reaction force, is short, and a moment arm length with respect to the power portion is short. Therefore, a force applied from the guide hole of the housing to the power portion of the collet is large. As a result, there is a possibility that the collet is excessively locked at the time of clamping operation, and cannot be released smoothly.

An object of the present invention is to provide a clamping apparatus capable of solving the above problems.

Means for Solving the Problems

In order to accomplish the objective mentioned above, according to the present invention, for example as illustrated in FIG. 1A and FIG. 1B, a clamping apparatus is constructed as follows.

A clamp rod 6 inserted into a guide hole 5 of a housing 4 has: a clamping member 10 provided at a leading end side of the clamp rod 6 in an axial direction; an inner piston 12; and a pressure receiving surface 13 approaching an axis toward a base end, which are arranged in this order in the axial direction. One outer piston 23 is inserted into a first annular space 21 between the inner piston 12 and the guide hole 5, and an output portion 26 for locking and releasing is provided on an inner periphery of a base end portion of the outer piston 23. A collet 33 inserted into a second annular space 32 between the pressure receiving surface 13 and the guide hole 5 is formed of a plurality of divided members 34 arranged circumferentially at substantially regular intervals. An input portion 36 driven by the output portion 26 is provided in an outer periphery portion of each divided member 34. In addition, a pressing surface 40 which makes a wedge-engagement with the pressure receiving surface 13 from a base end side is provided on an inner periphery portion of each divided member 34. There are provided a lock chamber 42 and a release chamber 47 which apply/release fluid pressure to/from a base end surface and a leading end surface of the outer piston 23, respectively.

The present invention provides, for example as shown in FIG. 1A and FIG. 1B, the following function and effect.

Different from the before-mentioned conventional art, for the above clamp rod, there is no need to arrange two outer pistons on respective outer sides of the collet in directions toward both ends thereof, and therefore, a total length of the clamp rod is shorter and a total length of the clamping apparatus is also shorter. In addition, since the output portion is provided in an inner periphery portion of the outer piston, the substantially whole outer peripheral surface of the outer piston can be used as a sliding surface for guiding. This enables the outer piston to have a shorter total length while keeping a necessary guiding area.

As a result, the total length of the clamping apparatus is decreased further, and clamping apparatus can be made compact.

In a clamping state of the clamping apparatus, a reaction force is exerted from an object to be fixed such as a mold to a leading end portion of the clamp rod, and the clamping reaction force is received by: a fulcrum portion midway in the clamp rod in the axial direction; and the divided members of the collet. Here, since the pressing surface of each divided member of the collet is wedge-engaged with the pressure receiving surface provided on a base end portion of the clamp rod, a moment arm length between the fulcrum portion and the divided members is long. Because of this, in the clamping state, a force applied from the guide hole of the housing to the divided members of the collet is small. As a result, the collet is not excessively locked at the time of clamping operation, and can be released smoothly at the time of unclamping operation.

In the present invention, it is preferable that the output portion 26 and each input portion 36 are connected to each other so as to be movable together in the axial direction and so as to be movable radially relative to each other.

Further, in the present invention, it is preferable that the output portion 26 includes a first output portion 27 for locking and a second output portion 28 for releasing, and each input portion 36 includes a first input portion 37 facing the first output portion 27 and a second input portion 38 facing the second output portion 28.

Furthermore, in the present invention, it is preferable that a fitting gap G which allows the clamp rod 6 to radially swing is formed between an outer peripheral surface of the inner piston 12 and an inner peripheral surface of the outer piston 23.

Moreover, in the present invention, it is preferable that: a spring seat 51 is attached to a base end portion of the clamp rod 6; and between the spring seat 51 and each divided member 34 of the collet 33, a lock spring 54 which biases the corresponding divided member 34 toward a leading end is mounted.

It is preferable that a driven portion 57 which faces the collet 33 from the base end side is provided in the spring seat 51.

In this case, the outer piston is capable of having a function to retract the clamp rod toward the base end, via the collet and the driven portion. As the outer piston has this function, a part of the spring seat can be used as the driven portion, and therefore, it is not necessary to arrange an exclusive driven portion.

It is preferable that two or three lock springs 54 are provided for each divided member 34 of the collet 33.

Further, it is preferable that the collet 33 includes at least three divided members 34.

In each aspect of the present invention, it is preferable to configure the apparatus as follows.

The guide hole 5 is inclined in the housing 4 to be attached to a support surface 2 of a stationary table 1 so that the guide hole 5 approaches the support surface 2 toward a leading end. An object to be fixed 7 placed on the leading end side of the housing 4 is pressed by a leading end portion of the clamping member 10 onto the support surface 2.

DESCRIPTION OF THE REFERENCE NUMERALS

1: stationary table, 2: support surface, 4: housing, 5: guide hole (support hole 15 and cylinder hole 16), 6: clamp rod, 7: object to be fixed (mold), 10: clamping member, 12: inner piston, 13: pressure receiving surface, 21: first annular space, 23: outer piston, 26: output portion, 27: first output portion, 28: second output portion, 32: second annular space, 33: collet, 34: divided member, 36: input portion, 37: first input portion, 38: second input portion, 40: pressing surface, 42: lock chamber, 47: release chamber, 51: spring seat, 54: lock spring, 57: driven portion, G: fitting gap.

BEST MODE FOR CARRYING OUT THE INVENTION

Figure 1A:
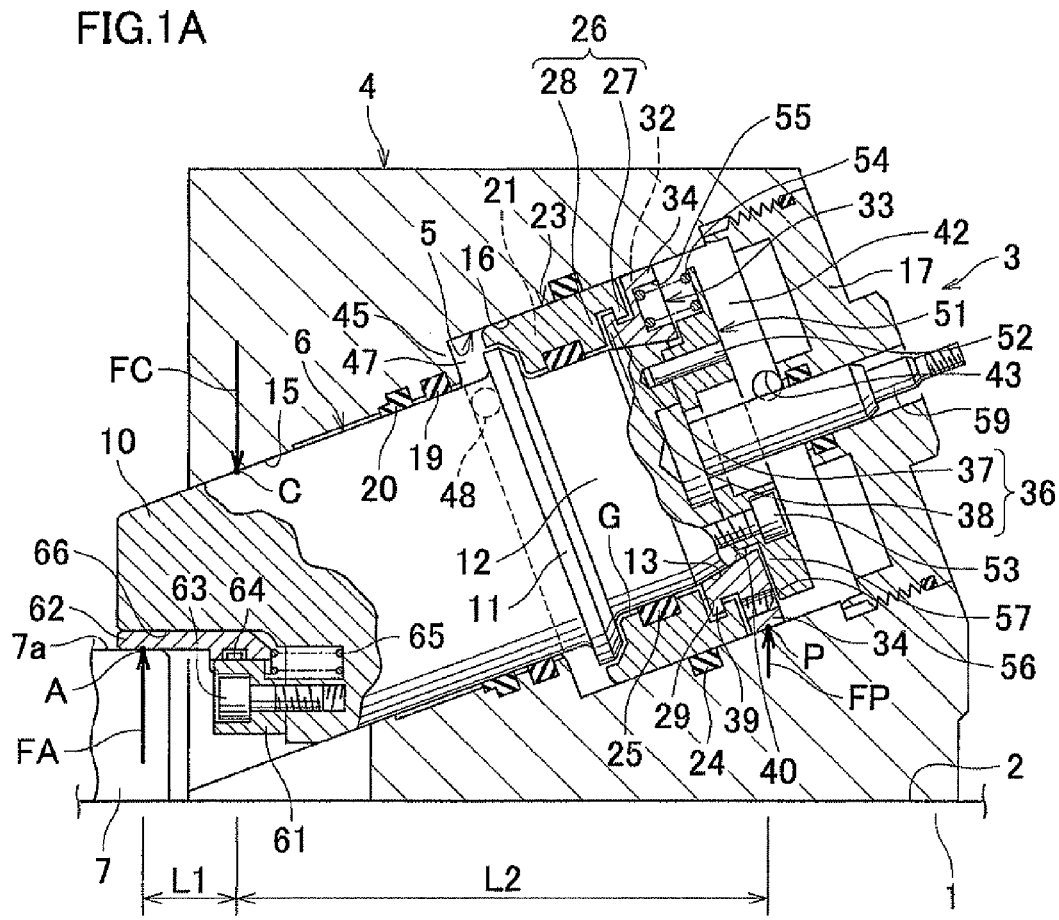
FIG. 1A is an elevational view in section of a clamping apparatus to which the present invention is applied.
Figure 1B:
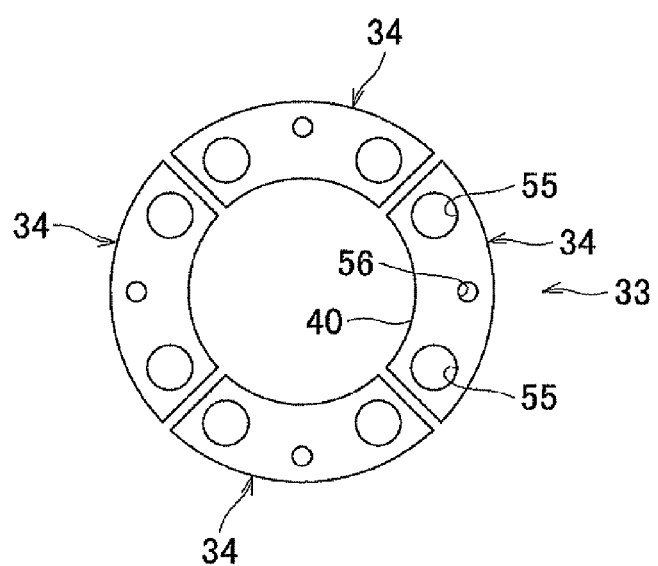
FIG. 1B is a right side view of a collet provided in the clamping apparatus.

Hereinafter, an explanation will be made for one embodiment of the present invention using FIG. 1. FIG. 1A is an elevational view in section of a clamping apparatus to which the present invention is applied. FIG. 1B is a right side view of a collet provided in the clamping apparatus.

A housing 4 of a clamping apparatus 3 is attached to a support surface 2 of a stationary table 1 by a plurality of fastening bolts (not shown). In the housing 4, a guide hole 5 is opened, which is inclined downward to the left in FIG. 1A. Specifically, the guide hole 5 is formed so as to approach the support surface 2 toward the left (toward a leading end). At the time of clamping operation, a left end portion (leading end portion) of a clamp rod 6 inserted into the guide hole 5 presses, onto the support surface 2, a mold (object to be fixed) 7 placed on a left side (leading end side) of the housing 4.

The clamp rod 6 includes: a clamping member 10 provided at a portion near a left end (leading end) of the clamp rod 6 in its axial direction; a flange 11 and an inner piston 12 which are provided at a portion near a right end (base end) of the clamp rod 6; and a tapered pressure receiving surface 13 provided on a right end portion (base end portion) of the clamp rod 6. The clamping member 10, the flange 11, the inner piston 12, and the pressure receiving surface 13 are not separable from one another and are formed integrally, and they are arranged in this order in the axial direction. The pressure receiving surface 13 is formed so as to approach an axis toward the right end (base end).

The guide hole 5 includes: a smaller diameter support hole 15 which houses a left half portion of the clamp rod 6; and a larger diameter cylinder hole 16 which houses a right half portion of the clamp rod 6. An end plate 17 is screwed hermetically to a peripheral wall of a right end portion of the cylinder hole 16.

The clamping member 10 is hermetically inserted into the support hole 15 via a pair of sealing members 19, 20 so as to be movable in the axial direction. A right half portion of the support hole 15 is formed to have a slightly larger diameter than a left half portion of the support hole 15, and a later-described fulcrum portion C is formed on a portion of the clamping member 10, which corresponds to the left half portion of the support hole 15.

One outer piston 23 is inserted into a first annular space 21 formed between an outer peripheral surface of the inner piston 12 and the cylinder hole 16. An outer peripheral surface of the outer piston 23 is hermetically sealed so as to be movable in the axial direction, via an outer sealing member 24 mounted to the cylinder hole 16. Further, the outer piston 23 is hermetically sealed so as to be movable in the axial direction relative to the inner piston 12, via an inner sealing member 25 mounted on an inner peripheral surface of the outer piston 23. A fitting gap G formed between the inner peripheral surface of the outer piston 23 and the outer peripheral surface of the inner piston 12 is set to have a value larger than that of a fitting gap between the outer peripheral surface of the outer piston 23 and the cylinder hole 16.

An output portion 26 for locking and releasing provided on the outer piston 23 includes: a first output portion 27 for locking; and a second output portion 28 for releasing. To be more specific, on an inner periphery of a right end portion (base end portion) of the outer piston 23, a fitting groove 29 is formed, and a right wall of the fitting groove 29 constitutes the first output portion 27, while a left wall of the fitting groove 29 constitutes the second output portion 28.

A collet 33 is inserted into a second annular space 32 between the pressure receiving surface 13 and the cylinder hole 16. The collet 33 is, mainly as shown in FIG. 1B, formed of four divided members 34 arranged circumferentially at substantially regular intervals. In an outer periphery portion of each divided member 34, an input portion 36 driven by the output portion 26 is provided. Each input portion 36 includes: a first input portion 37 which faces the first output portion 27 for locking from a left side; and a second input portion 38 which faces the second output portion 28 from a right side. To be more specific, a projection 39 to be inserted into the fitting groove 29 is provided to an outer periphery portion of a left end portion (leading end portion) of each divided member 34, and an upper right portion of the projection 39 constitutes the first input portion 37, while a left portion of the projection 39 constitutes the second input portion 38.

With the above structure, the output portion 26 and each input portion 36 are connected to each other so as to be movable together in the axial direction and so as to be movable radially relative to each other.

In addition, on an inner periphery portion of each divided member 34, there is provided a pressing surface 40 which makes a wedge-engagement with the pressure receiving surface 13 from a right end side (base end side). It is preferable that a slope of the pressure receiving surface 13 and the pressing surface 40 is within the range from 7 degrees to 15 degrees (in terms of tapered angle, from 14 degrees to 30 degrees), and it is more preferable that the slope is within the range from 8.5 degrees to 12 degrees (in terms of tapered angle, from 17 degrees to 24 degrees).

An outer peripheral surface of each divided member 34 is slidably in contact with an inner peripheral surface of the cylinder hole 16, and is preferably formed into an arc shape in a section of FIG. 1A.

Further, for a large-size clamping apparatus, it is preferable that an inner diameter size of a right half region of the cylinder hole 16 (a region where the divided members 34 slide) is set to be slightly larger than an inner diameter size of a left half region of the cylinder hole 16 (a region where the outer piston 23 slides). With this, even if the right half region of the cylinder hole 16 is plastically deformed by a large force exerted from the divided members 34, it is possible to smoothly remove the outer piston 23 from the cylinder hole 16 at the time of maintenance of the clamping apparatus.

A lock chamber 42 is formed between the end plate 17 and the outer piston 23, and a supply and discharge port 43 for locking is opened in an inner peripheral surface of the lock chamber 42. By supplying/discharging pressurized oil to/from the lock chamber 42, fluid pressure is applied to/released from a right end surface of the outer piston 23 (and a section of the inner piston 12).

In addition, a release chamber 47 is formed between a step portion 45 formed in the guide hole 5 and the outer piston 23, and a supply and discharge port 48 for releasing is opened in an inner peripheral surface of the release chamber 47. By supplying/discharging pressurized oil to/from the release chamber 47, fluid pressure is applied to/released from a left end surface of the outer piston 23.

Further, since the flange 11 of the clamp rod 6 is received by the step portion 45, excessive leftward advance of the clamp rod 6 is prevented.

An annular spring seat 51 is fixed to the right end portion (base end portion) of the clamp rod 6, using one or more positioning pins 52 and a plurality of attaching bolts 53. Between the spring seat 51 and each divided member 34 of the collet 33, lock springs 54 which bias the corresponding divided member 34 leftward (toward the leading end) are mounted. Herein, each lock spring 54 is a compression coil spring, and two lock springs 54 are arranged for one divided member 34. Specifically, as shown in FIG. 1B, two spring installation holes 55 are formed in a recessed manner, at both side portions of each divided member 34, respectively.

In addition, each divided member 34 is penetrated by one female screw hole 56. At the time of assembling or maintenance of the clamping apparatus, bolts (not shown) screwed into the respective female screw holes 56 allow the outer piston 23 and the collet 33 to be attached/detached as one set. Further, at the time of maintenance, by pushing the outer piston 23 with the bolts (not shown), it is possible to forcibly release the wedge-engagement between the pressing surface 40 of each divided member 34 and the pressure receiving surface 13.

Moreover, in the spring seat 51, a driven portion 57 is provided to face the inner periphery portion of each divided member 34 from the right side with a predetermined gap therebetween.

Further, a detection rod 59 is hermetically inserted into the end plate 17 so as to be movable in the axial direction, and a left end portion of the detection rod 59 is attached to the right end portion of the clamp rod 6 through the spring seat 51. A displacement amount of a detection member (not shown) screwed to a right end portion of the detection rod 59 is detected using a sensor (not shown) such as a limit switch, and thereby an operation state of the clamp rod 6 can be detected.

A shuttle member 62 is mounted to a left end portion of the clamping member 10 of the clamp rod 6, via a guide block 61, so as to be reciprocatable in left and right directions. The guide block 61 is fixed to a lower left portion of the clamping member 10 by a plurality of bolts 63. The shuttle member 62 is smoothly guided in the left and right directions according to fitting with the guide block 61 and fitting with a guide pin 64, and is biased by an advancing spring 65 leftward and in a clockwise direction in FIG. 1A, so that the shuttle member 62 is in contact with a sliding surface 66 of the clamping member 10. Further, the guide pin 64 prevents the shuttle member 62 from advancing leftward beyond a predetermined amount.

The clamping apparatus operates as follows.

In a clamping state of FIG. 1A, due to a hydraulic force of the lock chamber 42, the inner piston 12 causes, via the clamping member 10, the shuttle member 62 to come into contact with the mold 7 from above, and the outer piston 23 causes the pressing surfaces 40 of the collet 33 to make a wedge-engagement with the pressure receiving surface 13 of the clamp rod 6, thereby firmly locking the clamp rod 6.

When the clamping apparatus 3 is switched from the clamping state to an unclamping state, pressurized oil in the lock chamber 42 is discharged, and pressurized oil is supplied to the release chamber 47. As a result, a hydraulic force of the release chamber 47 causes the outer piston 23 to retract along the guide hole 5 upward to the right. With this, first, the second output portion 28 of the outer piston 23 presses the second input portion 38 of each divided member 34 of the collet 33 upward to the right to release the wedge-engagement. Subsequently, the second output portion 28 causes, via the collet 33 and the driven portion 57 of the spring seat 51, the clamp rod 6 to retract upward to the right. Thereby, the left end portion of the clamping member 10 of the clamp rod 6 is housed in the housing 4.

Meanwhile, when the clamping apparatus 3 is switched from the unclamping state to the clamping state of FIG. 1A, pressurized oil in the release chamber 47 is discharged and pressurized oil is supplied to the lock chamber 42. Then, as shown in FIG. 1A, due to a hydraulic force of the lock chamber 42, the inner piston 12 causes the clamp rod 6 to advance downward to the left, so that the clamping member 10 presses and comes into contact with the mold 7 from above via the shuttle member 62.

Subsequently, relative to the clamp rod 6 whose advancing movement downward to the left is blocked, the outer piston 23 advances further downward to the left. As a result, the pressing surface 40 of each divided member 34 of the collet 33 makes a wedge-engagement with the pressure receiving surface 13 of the clamp rod 6, so that the clamp rod 6 is frictionally secured in the cylinder hole 16 firmly via the plurality of divided members 34.

In the clamping state, a reaction force FA is exerted from the mold 7 onto an action portion A of the shuttle member 62. The reaction force FA is received by the fulcrum portion C of the clamp rod 6 and a power portion (a portion where force is applied) P of the divided members 34 of the collet 33. Here, assuming that: a moment arm length between the fulcrum portion C and the action portion A is L1; and a moment arm length between the fulcrum portion C and the power portion P is L2, a force FP applied to the power portion P is a small value, which is $FA \times (L1/L2)$. Further, a bearing force FC exerted on the fulcrum portion C is FA+FP.

Thus, since the force applied from the guide hole 5 of the housing 4 to the power portion P of the collet 33 is small, the collet 33 is not excessively locked at the time of clamping operation, and can be released smoothly at the time of unclamping operation.

Furthermore, in the clamping state, even if a hydraulic force in the lock chamber 42 unusually decreases or disappears, for example, due to a leak of pressurized oil from a pressurized oil supplying pipe, the clamp rod 6 is locked by each divided member 34 of the collet 33, and therefore, it is possible to prevent the clamping state of the clamp rod 6 from being released. Moreover, since the lock springs 54 hold the divided members 34 in a wedge-engagement state, the release of the clamping state can be surely prevented. In addition, when the hydraulic force disappears for example, an external force such as gravity or a machining reaction force exerted on the mold 7 compels the clamp rod 6 to retract slightly. Then, the pressure receiving surface 13 further bites into the collet 33 frictionally secured in the cylinder hole 16, and the clamp rod 6 is more firmly locked.

In the meantime, in the clamping state of FIG. 1A, components such as the housing 4, fastening bolts (not shown) of the housing 4, the clamp rod 6, the outer piston 23, and the collet 33, are firmly locked under a condition where distortion due to a clamping load occurs, and therefore it is difficult to release the locking. However, since the relatively larger fitting gap G is provided between the inner piston 12 and the outer piston 23, the clamp rod 6 is allowed to swing in the clockwise direction about the fulcrum portion C when the clamp rod 6 is driven to retract upward to the right at an early stage of the unclamping operation. This operation instantly eliminates the above-described distortion in the clamping state, and makes it possible to surely retract the clamp rod 6.

Further, the shuttle member 62 operates as follows.

When the clamping member 10 is advanced downward to the left at the time of clamping operation, first, the shuttle member 62 comes into contact with a clamped surface 7a of the mold 7 from diagonally above. In the case where a friction coefficient between the clamped surface 7a and the shuttle member 62 is large, the shuttle member 62 is frictionally secured to the clamped surface 7a, and only the clamping member 10 slides downward to the left with the shuttle member 62 left behind on the right side, so that the clamping member 10 firmly presses and fixes the mold 7 via the shuttle member 62 onto the stationary table 1. On the other hand, at the time of unclamping operation switched from the clamping state, first, a slide occurs between the shuttle member 62 frictionally secured to the clamped surface 7a and the clamping member 10, and only the clamping member 10 is driven upward to the right with the shuttle member 62 left behind. Subsequently, the clamping member 10 driven to retract causes the shuttle member 62 to retract upward to the right, and switches the mold 7 into the unclamping state. Then, at a last stage of the unclamping operation, the advancing spring 65 causes the shuttle member 62 to return to a left position.

Furthermore, in the unclamping state, the advancing spring 65 causes the shuttle member 62 to be into contact with the sliding surface 66 of the clamping member 10, and therefore it is possible to prevent the shuttle member 62 from being inclined downward to the left, thereby ensuring the clamping by the shuttle member 62.

The clamping apparatus of the above embodiment brings about following advantages in addition to the above-described various advantages.

Different from the before-mentioned conventional art, for the clamp rod 6, there is no need to arrange two outer pistons on respective outer sides of the collet 33 in the directions toward both ends thereof, and therefore, a total length of the clamp rod is shorter and a total length of the clamping apparatus is also shorter.

Since the output portion 26 is provided in an inner periphery portion of the outer piston 23, the substantially whole outer peripheral surface of the outer piston 23 can be used as a sliding surface for guiding. This enables the outer piston 23 to have a shorter total length while keeping a necessary guiding area. As a result, the total length of the clamping apparatus can be decreased further.

The collet 33 is formed of the four divided members 34, and therefore, by moving the four divided members 34 radially inwardly when the collet 33 is attached to the outer piston 23, it is possible to easily fit the projecting input portion 36 of each divided member 34 to the grooved output portion 26 of the outer piston 23. This saves the trouble in the attaching process.

Since the outer sealing member 24 for the outer piston 23 can be manufactured so as not to axially overlap a gap between adjacent divided members 34, 34, the trouble in incorporating of the outer piston 23 can be saved and also damage to the outer sealing member 24 can be prevented.

Since a large number of the lock springs 54 can be arranged circumferentially, a total spring force can be increased compared to the case of one or two spring(s), and also a setting spring force can be freely selected. Moreover, the large number of lock springs 54 arranged circumferentially enable the outer piston 23 to be moved for locking via the collet 33, substantially coaxially with the guide hole 5.

In addition, setting a length of a screwed portion of each attaching bolt 53 to be longer than a compression length of each lock spring 54 makes it easier to attach and detach the spring seat 51.

As the outer piston 23 has a function to retract the clamp rod 6 rightward via the collet 33 and the driven portion 57, a part of the spring seat 51 can be used as the driven portion 57, and therefore, it is not necessary to arrange an exclusive driven portion 57.

The above embodiment may be modified as follows.

The collet 33 may be formed of a plurality of divided members 34 arranged circumferentially at substantially regular intervals, and may be formed of two, three, or five or more divided members, instead of four divided members exemplarily mentioned. Further, it is preferable to provide three or four divided members 34 for efficient attaching operation, or the like.

As for the lock springs 54, one or three lock spring(s) 54 may be provided for one divided member 34, instead of two lock springs 54 exemplarily mentioned.

The lock springs 54 and the spring seat 51 may be omitted. In this case, in order to retract the clamp rod 6 upward to the right, it is preferable to attach an exclusive driven portion 57 to the right end portion of the clamp rod 6.

It is possible to configure the clamp rod 6 so that the clamp rod 6 is only locked and released at a clamping position shown in FIG. 1A, instead of an exemplarily mentioned configuration in which the clamp rod 6 advances/retracts widely in the axial direction. In this case, a retraction stroke of the outer piston 23 is smaller, and the driven portion 57 is no longer needed.

Pressurized fluid used in the clamping apparatus may be gas such as compressed air, instead of pressurized oil exemplarily mentioned.

An object to be fixed may be a workpiece, a jig pallet, or the like, instead of the mold 7 exemplarily mentioned.

What is claimed is:

1. A clamping apparatus comprising:
   a clamp rod (6) inserted into a guide hole (5) of a housing (4), the clamp rod (6) having a clamping member (10) provided at a leading end side of the clamp rod (6) in an axial direction, an inner piston (12), and a pressure receiving surface (13) approaching an axis toward a base end, which are arranged in this order in the axial direction;

one outer piston (23) inserted into a first annular space (21) between the inner piston (12) and the guide hole (5), the outer piston (23) having an output portion (26) for locking and releasing on an inner periphery of a base end portion of the outer piston (23);

a collet (33) inserted into a second annular space (32) between the pressure receiving surface (13) and the guide hole (5) and having a plurality of divided members (34) arranged circumferentially at substantially regular intervals, wherein an input portion (36) driven by the output portion (26) is provided in an outer periphery portion of each divided member (34), and a pressing surface (40) which makes a wedge-engagement with the pressure receiving surface (13) from a base end side is provided on an inner periphery portion of each divided member (34); and a lock chamber (42) and a release chamber (47) which apply/release fluid pressure to/from a base end surface and a leading end surface of the outer piston (23), respectively.

2. The clamping apparatus according to claim 1, wherein the output portion (26) and each input portion (36) are connected to each other so as to be movable together in the axial direction and so as to be movable radially relative to each other.

3. The clamping apparatus according to claim 1 or 2, wherein the output portion (26) includes a first output portion (27) for locking and a second output portion (28) for releasing, and each input portion (36) includes a first input portion (37) facing the first output portion (27) and a second input portion (38) facing the second output portion (28).

4. The clamping apparatus according to claim 1, wherein a fitting gap (G) which allows the clamp rod (6) to radially swing is formed between an outer peripheral surface of the inner piston (12) and an inner peripheral surface of the outer piston (23).

5. The clamping apparatus according to claim 1, wherein a spring seat (51) is attached to a base end portion of the clamp rod (6), and between the spring seat (51) and each divided member (34) of the collet (33), a lock spring (54) which biases the corresponding divided member (34) toward a leading end is mounted.

6. The clamping apparatus according to claim 5, wherein a driven portion (57) which faces the collet (33) from the base end side is provided in the spring seat (51).

7. The clamping apparatus according to claim 5 or 6, wherein two or three lock springs (54) are provided for each divided member (34) of the collet (33).

8. The clamping apparatus according to claim 1, wherein the collet (33) includes at least three divided members (34).

9. The clamping apparatus according to claim 1, wherein the guide hole (5) is inclined in the housing (4) to be attached to a support surface (2) of a stationary table (1) so that the guide hole (5) approaches the support surface (2) toward a leading end, and an object to be fixed (7) placed on the leading end side of the housing (4) is pressed by a leading end portion of the clamping member (10) onto the support surface (2).

* * * * *